(12) United States Patent  (10) Patent No.: US 8,812,404 B2
Aleong et al.  (45) Date of Patent: Aug. 19, 2014

(54) INFORMATION AGGREGATION SERVICE

(75) Inventors: Michelle M. Aleong, Seattle, WA (US);
Omar H. Shahine, Menlo Park, CA (US); Paul A. Elliott, Woodinville, WA (US); Jeffrey Craig Kunins, Seattle, WA (US); Oludare V. Obasanjo, Renton, WA (US); Bhupinder S. Sethi, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 454 days.

(21) Appl. No.: 12/498,802

(22) Filed: Jul. 7, 2009

(65) Prior Publication Data

US 2011/0010305 A1  Jan. 13, 2011

(51) Int. Cl.
*G06Q 10/00* (2012.01)

(52) U.S. Cl.
USPC ........................................................ 705/319

(58) Field of Classification Search
CPC .............. G06Q 30/02; G06Q 30/0269; G06Q 30/0201; G06Q 30/0255; G06Q 30/0241; G06Q 50/01; H04L 67/306; H04L 67/22; H04L 67/20; H04L 43/04; H04L 51/32; H04L 63/102; H04L 12/588; H04L 67/26
USPC ........................................................ 705/319
See application file for complete search history.

(56) References Cited

U.S. PATENT DOCUMENTS

| 2007/0157108 | A1 | 7/2007 | Bishop |
| 2007/0162458 | A1 | 7/2007 | Fasciano |
| 2007/0266097 | A1 | 11/2007 | Harik et al. |
| 2008/0065701 | A1 | 3/2008 | Lindstrom et al. |
| 2008/0091723 | A1* | 4/2008 | Zuckerberg et al. ........ 707/104.1 |
| 2008/0134052 | A1 | 6/2008 | Davis et al. |
| 2008/0172496 | A1* | 7/2008 | Middleton et al. ............ 709/246 |
| 2008/0182563 | A1* | 7/2008 | Wugofski et al. .......... 455/414.2 |
| 2008/0256170 | A1 | 10/2008 | Hayashi et al. |
| 2009/0313244 | A1* | 12/2009 | Sokolenko et al. ............... 707/5 |

FOREIGN PATENT DOCUMENTS

| CN | 101268461 | 9/2008 |
| JP | 2008158792 A | 7/2008 |

OTHER PUBLICATIONS

Kirkpatrick, Marshall. "Lifestreaming Comes to Yahoo! With MyBlogLog Overhaul", Retrieved at http://readwrite.com/2008/02/28/lifestreaming_comes_to_yahoo. Feb. 28, 2008.*

"Updates from Your Gmail Contacts", retrieved at <<http://googlesystem.blogspot.com/2007/12/updates-from-your-gmail-contacts.html>>, Dec. 29, 2007, pp. 6.

(Continued)

*Primary Examiner* — Gabrielle McCormick

(74) *Attorney, Agent, or Firm* — Bryan Webster; Andrew Sanders; Micky Minhas

(57) ABSTRACT

Information aggregation techniques are described. In an implementation, a communication is received that includes an indication of a source of information associated with a non-member of the social network. Information associated with the non-member is aggregated from the source. The aggregation may be performed in response to receipt of a selection by a member of the social network service to interact with the information from the source. The aggregated information may then be presented to a member in conjunction with webpages output for interaction with the social network.

20 Claims, 4 Drawing Sheets

(56) References Cited

OTHER PUBLICATIONS

Kirkpatrick, Marshall, "Lifestreaming Comes to Yahoo! with MyBlogLog Overhaul", retrieved at <<http://www.readwriteweb.com/archives/lifestreaming_comes_to_yahoo.php>>, Feb. 28, 2008, pp. 3.

Solis San, Brian, "PeopleBrowsr Centralizes Conversations & Relationships: Introduces a Dashboard for Social Networks", retrieved at <<http://www.briansolis.com/2008/12/peoplebrowsr-simplifies-online.html>>, Dec. 5, 2008, pp. 11.

"NetVibes", retrieved at <<http://translate.netvibes.com/glossary.php>>, Mar. 17, 2009, pp. 14.

Jeffrey, "FriendFeed is Your Friend", retrieved at <<http://www.windowslive.com/connect/post/mjflynt.spaces.live.com-Blog-cns!C09BCC3825FAC6AC!1662.entry>>, Feb. 3, 2009, pp. 4.

Tim K, "New Look and Features for Bebo", retrieved at <<http://www.zmogo.com/tag/social-networking/>>, Mar. 5, 2009, pp. 14.

"Outlines as a Structure for Distributed Friending", retrieved at <<http://blog.broadbandmechanics.com/2009/01/outlines-as-a-structure-for-distributed-friending>>, Mar. 17, 2009, pp. 4.

"International Search Report", Mailed Date: Feb. 8, 2011, Application No. PCT/US2010/040279, Filed Date: Jun. 29, 2010, pp. 8.

"Extended European Search Report", European Patent Application No. 10797624.3, (Mar. 1, 2013), 5 pages.

"Foreign Office Action", CN Application No. 201080030621.4, Apr. 1, 2014, 10 Pages.

"Foreign Office Action", AU Application No. 2010270835, Apr. 3, 2014, 4 Pages.

"Foreign Office Action", EP Application No. 10797624.3, Mar. 3, 2014, 5 Pages.

\* cited by examiner

INFORMATION AGGREGATION SERVICE

BACKGROUND

Social network services permit users (e.g., members) to establish a social network and communicate information one to another via the social network. Members of a social network may know other users who have not joined their social network. For example, a group of friends in a social network may have another friend that is not a member.

Using a traditional approach to interact with the non-member friend, the friends in the social network may individually obtain information from the non-member friend outside of the social network service, such as by email or by visiting a website to which the non-member posts. This traditional approach, however, involves each member interacting separately with the non-member friend. Accordingly, the information related to the non-member that is distributed to different members may not be the same. In addition, the friends in the group may forget to check in on the non-member friend outside of the social network service and doing so may be quite inconvenient for the friends.

SUMMARY

Information aggregation techniques are described herein. In an implementation, a communication is received that includes an indication of a source of information associated with a non-member of the social network. Information associated with the non-member is aggregated from the source. The aggregation may be performed in response to receipt of a selection by a member of the social network service to interact with the information from the source. The aggregated information may then be presented to a member in conjunction with web pages output for interaction with the social network.

In an implementation, one or more computer-readable storage media comprise instructions that are executable to aggregate information associated with a non-member of a social network responsive to receipt of selection by a member of the social network to interact with information from an external source. The information may also be stored for the non-member and used to populate an account for the non-member with the social network service when the non-member chooses to create such an account.

In an implementation, one or more computer-readable media comprise instructions that are executable to receive information from a feed of information that is associated with a non-member of a social network. The information is aggregated for interaction of the non-member so the information is available to one or more accounts for members of the social network that have a contact record for the non-member.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Social network services permit members to establish a social network and exchange information one to another using the social network service, such as through member profile pages, message boards, a group website (including one or more web pages), and group email that may be provided by the social network service. Sometimes members would like to interact with someone who is not a member of their social network, e.g., a non-member. For example, a member may know another friend who is not a member of the social network. The non-member may author information (e.g., status updates, posts, pictures, and content) via an external source, such as via a blog website. Traditionally, the member may have to manually navigate to an appropriate website (e.g., the blog) in order to view the non-member's information. This traditional approach may be time consuming and inconvenient for the member.

Information aggregation techniques are described herein. The techniques may be implemented to aggregate information associated with a non-member of a social network for communication to members of the social network. A social network service may be configured to aggregate information that is authored by the non-member using one or more external sources. The external sources may include various sources outside of the social network service. The external sources may be available from a provider of the social network service and/or from third-party providers. For example, a corporation may operate both the social network service and a third party provider. The social network service may present the information regarding the non-member to one or more members of the social network who have contact records for the non-member. In this manner, the members may view the information without having to manually navigate to each of the external sources used by the non-member to author the information.

In the following discussion, an example environment and systems are first described that are operable to perform information aggregation techniques via a network service, e.g., a social network service. Example procedures are then described that may be implemented using the example environment as well as other environments. Accordingly, implementation of the procedures is not limited to the environment and the environment is not limited to implementation of the procedures.

Example Environment

Figure 1:
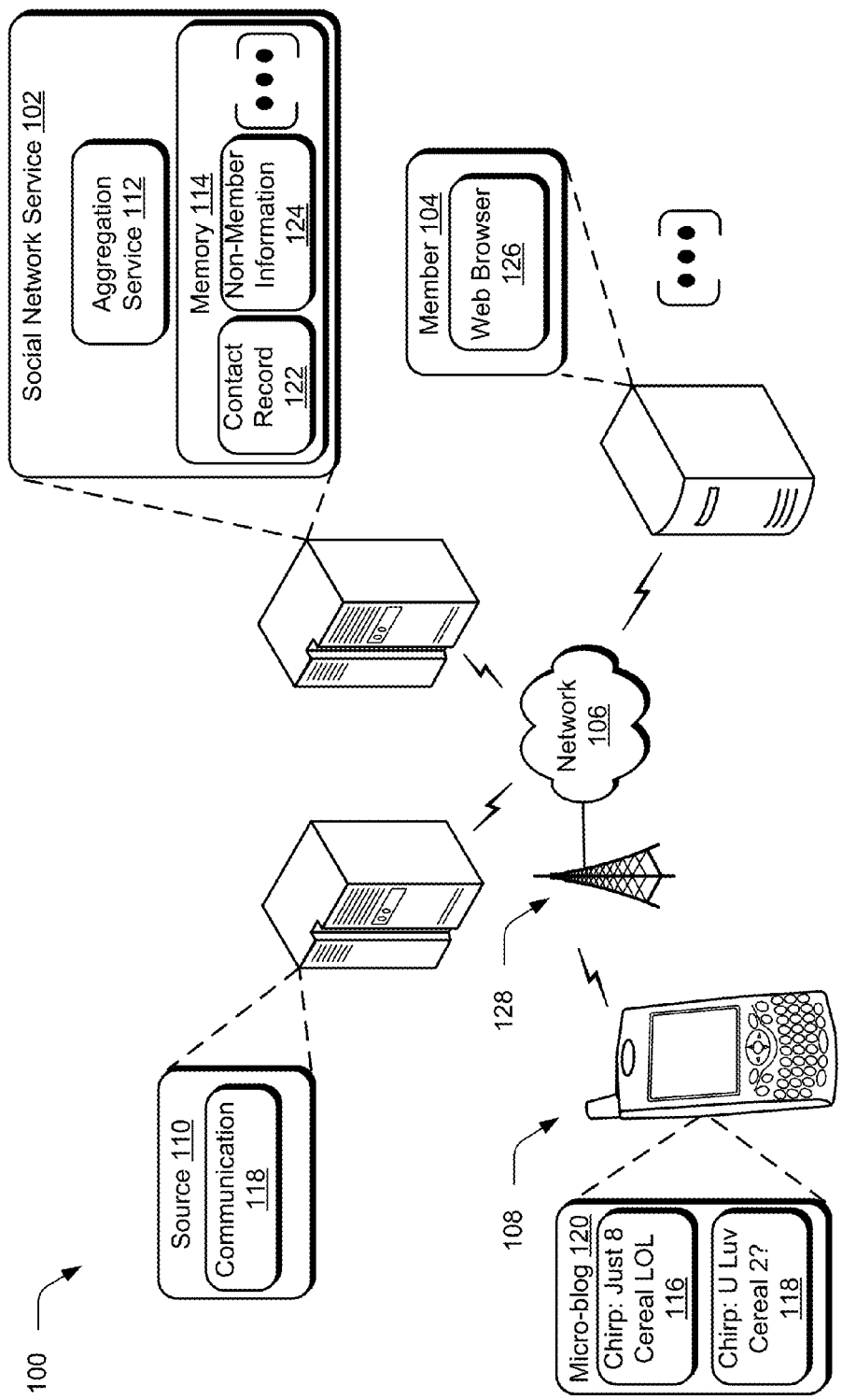
FIG. 1 is an illustration of an environment in an example implementation that is operable to perform information aggregation.

FIG. 1 is an illustration of an environment 100 in an example implementation that is operable to aggregate information. Example information includes content such as, blog entries, micro-blog entries, instant messages, off-line messages, electronic mail messages (email); and so forth. Other information may include photographs, videos, audio clips, animation, and so on.

The illustrated environment 100 includes a social network service 102, and a plurality of members (an example member 104 is illustrated), that are communicatively coupled via a network 106. A non-member (illustrated as a smart phone 108) and a source 110 (e.g., an external source) are also illustrated. For additional clarity in the discussion, a member and/or a non-member may refer to a user or person who operates, respectively, the member 104 or non-member device. The member 104, the social network service 102, non-member, the source 110, and the network 106 may be representative of one or more devices. For example, the member 104 may be representative of multiple members.

As illustrated, the social network service 102 includes an aggregation service 112 and memory 114. The social network service 102 is representative of functionality to allow members to interact with information. The social network service 102 may permit members to exchange information, access information stored by the social network service 102, and access information from a source (e.g., the source 110) that is accessible via the social network service 102. For example, the member 104 may use a link posted on the social network service 102 to access a webpage supported by an external source, e.g., a separate service or a third-party source.

For convenience, the functions performed by social network service 102 are described with respect to various services, modules, and devices. The modules and services in the social network service 102 may be arranged in a variety of ways and the described functions may be performed by a single module or service, performed by sub-modules or services, performed by a combination of modules and services, and so forth. For example, the aggregation service 112 may be executed by one or more processors for the social network service 102.

The aggregation service 112 is representative of functionality to aggregate information from various sources, such as the source 110. The social network service 102 may partner with the source 110 in order to permit communication of information, and so on. For example, the source 110 and social network service 102 may implement a common technical standard, permit the exchange of information, and so forth while remaining independent of each other.

In one or more embodiments, the aggregation service 112 may be configured to retrieve and/or forward information from the source 110. In this way, the social network service 102 may retrieve, for example, micro-blog entries (illustrated as entries 116, 118 in micro-blog 120) communicated via the source 110 so the member can follow information from the non-member.

The memory 114 may be used to store information, data, programs, and so on. The memory 114 may also store code used to implement the aggregation service 112 until executed by a processor communicatively coupled to the memory 114.

As further illustrated, the memory 114 includes a contact record 122 and non-member information 124. Non-member information 124 may be stored in the memory 114 so the information is available if the non-member chooses to become a member of the social network service 102. The non-member may become a member by creating an account with the social network service 102, e.g., a user account. The non-member information 124 may be used for other purposes as well, e.g., to minimize response time to access the non-member information, and so forth.

The contact record 122 represents data that is usable by a member to communicate with a non-member. The aggregation service 112 may use the contact record 122 for the non-member to enable the member 104 to communicate with the non-member via the social network service 102. The contact record 122 may include, for instance, data that is usable to access blog entries posted by the non-member. Example contact record data may include a link to a webpage that contains non-member information, a password, a user name, messaging address, and so on.

The aggregation service 112 may generate the contact record 122 in response to the member 104 manually adding the non-member and/or in response to a communication from the non-member. In the latter case, the non-member may send the member 104 a communication that is useable to generate the contact record 122. The contact record 122 may be used to enable the member 104 to send an electronic message to the non-member. The contact record 122 may also be used to access a variety of different external sources used by the non-member. For example, the contact record 122 may reference a micro-blog site on which the non-member posts, a feed of information associated with the non-member (e.g., a photograph sharing website), and so forth.

The social network service 102 may also perform a variety of other functions and include other modules and/or services for performing these functions. For example, the social network service 102 may include an advertising module to present a targeted advertisement. Further, the social network service 102 may be provided by a service provider configured to manage a plurality of services that may be made available over the network 106 to members 104. For example, various services, including social network service 102, may be provided by the service provider via webpages, or other user interfaces, that are communicated over the network for output by the one or more members. Some examples of services include, but are not limited to, a search service, an email service to send and receive email, instant messaging service to provide instant messages between users, and the social network service 102 to facilitate connections and interactions between members 104 who share common interests and activities.

The memory 114 is representative of functionality to store information and other data, e.g., data forming a contact record. As illustrated, the memory 114 stores non-member information 124 on behalf of the aggregation service 112. Although a single memory 114 is shown, a wide variety of types and combinations of memory (e.g., tangible memory) may be employed, such as random access memory (RAM), hard disk memory, removable medium memory, external memory, and other types of computer-readable media. Other network services may implement the described techniques, approaches, and so on.

A member 104 may refer to a device that is used to access the social network service 102, e.g., via the website. In some implementations, the member 104 includes software that is usable to access the social network service 102. As illustrated, the member 104 includes a web browser 126 that is useable to access the website maintained by the social network service 102. The member 104 may be a logical client of the social network service 102, such as software, a device, and so forth. Other members 104 may implement web browsers in a similar manner.

The member 104 may be configured as various devices, such as personal computers, mobile computing devices, smart phones, personal digital assistants, laptops, and so on. The member 104 may be configured with limited functionality (e.g., thin devices) or with robust functionality (e.g., thick devices). Thus, a device's functionality and capabilities may vary based upon the device's software or hardware resources, e.g., processing power, memory (e.g., data storage capability), and so on.

The non-member may be a device that does not make use of the social network service 102. For example, the smart phone 108 may use another social network service, a different service, a different service provider, and/or other network enabled functionality, and so on. In some scenarios, the non-member may join the social network service 102, at which time, the non-member may make use of the social network service 102. Although the non-member may join the social network service 102 (e.g., by signing-up for an account), the term non-member is used to maintain continuity in the discussion.

The non-member is representative of functionality to interact with information via the source 110. For example, the non-member may interact by posting a blog, retrieving or accepting a blog entry, providing a photograph, creating content, and so forth. The non-member may also interact via a web browser that is operable to access one or more webpages provided by the source 110. The non-member may also be configured as various devices having differing capabilities, such as personal computers, mobile computing devices, smart phones, personal digital assistants, laptops, and so on.

The non-member may be functionally capable of interacting with the social network service 102 even though the non-member does not subscribe to or make use of the social network service 102. For instance, the non-member may have an account with a service provider that provides a variety of services including the social network service 102. The non-member may be able to select from among the variety of services available from the service provider.

The source 110 is operable to communicate information provided by the non-member. As illustrated, the source 110 is a web server that may maintain a website to provide information supplied by the non-member. Other types of information include photographs, web pages, audio files, and so on. In some situations, the source 110 is configured to forward the information to other parties. For example, the source 110 may forward the information to other users who have signed-up to follow or subscribe to the non-member's information. Accordingly, the source 110 may be configured to provide a feed of information related to a non-member to a group of subscribers. Although a micro-blog and micro-blogging are described, the source 110 may be used for other types of information. Example other sources (which may provide feeds of information) include but are not limited to, YOUTUBE (YouTube, LLC, San Bruno, Calif.), PHOTOBUCKET (Photobucket, Inc., San Francisco, Calif.); TWITTER (Twitter, Inc. San Francisco, Calif.); and so on. Feeds of information from such sources may be accessed via a link with the social network service 102. A link may used to direct the member's web browser 126 to the source 110.

As further illustrated in FIG. 1, one or more of the members, the non-member, the source 110, and the social network service 102 may communicate via the network 106. Although the network 106 is illustrated as the Internet, the network 106 may assume a wide variety of configurations. For example, the network 106 may include a wide area network (WAN), a local area network (LAN), a wireless network, a public telephone network, an intranet, and so on. Further, the network may be configured to include multiple networks. As illustrated, for example, the non-member may communicate via a wireless network 128, such as a cellular network with a transceiver that may also communicate via the network 106.

Generally, any of the functions described herein can be implemented using software, firmware, hardware (e.g., fixed logic circuitry), manual processing, or a combination of these implementations. The terms "module," "functionality," "service," and "logic" as used herein generally represent software, firmware, hardware, or a combination of software, firmware, or hardware. In the case of a software implementation, the module, functionality, or logic represents program code that performs specified tasks when executed on a processor (e.g., CPU or CPUs). The program code may be stored in one or more computer-readable memory devices (e.g., one or more tangible media), and so on. The structures, functions, approaches, and techniques described herein may be implemented on a variety of commercial computing platforms having a variety of processors.

Processors used to execute software in software implantations are not limited by the materials from which they are formed or the processing mechanisms employed therein. For example, processors may be comprised of semiconductor(s) and/or transistors (e.g., electronic integrated circuits (ICs)). Having discussed the environment 100, example systems that are operable to implement information aggregation techniques are now described.

Figure 2:
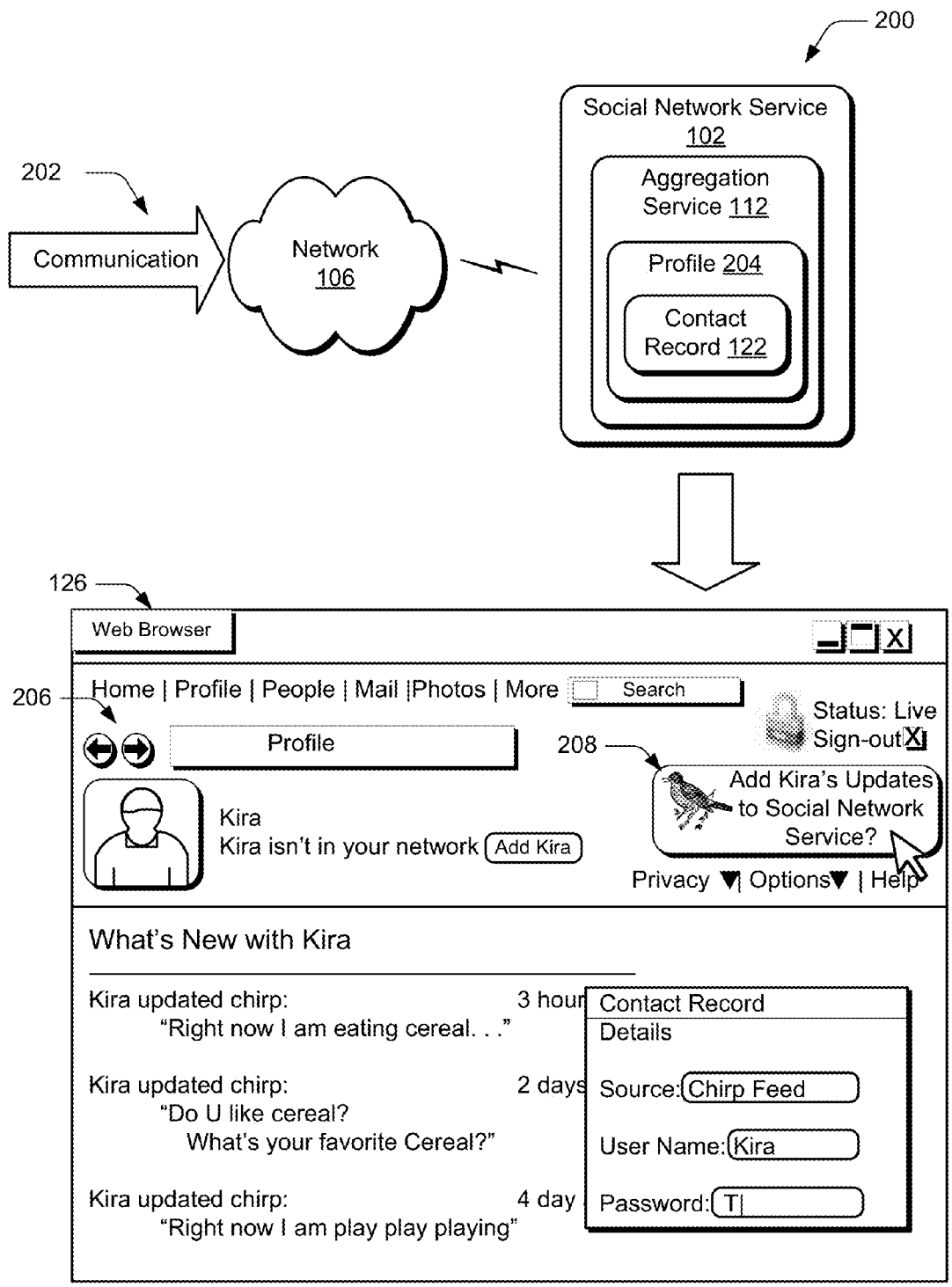
FIG. 2 is an illustration of a system in an example implementation showing use of the aggregation service of FIG. 1 to receive information from a non-member.

FIG. 2 depicts a system 200 in an example implementation illustrating operation of the aggregation service 112 in further detail. In addition, an example webpage 202 is also illustrated that is presented through use of the aggregation service 112 for output via a web browser, e.g., browser 126.

For the purposes of illustration only, a communication 202 including information is received from the non-member via the network 106. For example, the communication 202 may be a micro-blog entry. The information may be received in response to the member 104 accessing the source (e.g., via a website), receiving an invitation to follow the non-member information, and so forth.

In addition to the information, the communication 202 may contain data that indicates a source of the information (e.g., source 110) and/or is usable to follow, access, subscribe to, or otherwise make use of information from the non-member. Example data includes, but is not limited to, a uniform resource locator (URL), a source name, a user name, a password. For example, an email may include a link and a password to enable the social network service 102 to retrieve information subsequently posted by and/or communicated by the non-member.

The aggregation service 112 may use the data to create a contact record, e.g., contact record 122. For example, the aggregation service 112 may check for updates available from each source indicated in the contact record 122. The aggregation service 112 may check for updates upon the occurrence of an event (e.g., a log-in), at a configurable interval (e.g., daily), and so forth. The aggregation service 112 may include the contact record 122 in a profile 204 corresponding to the member 104.

The aggregation service 112 is operable to receive information for presentation to the member 104. For example, the aggregation service 112 may aggregate the non-member's micro-blog posts. In the illustrated example, the presentation is output as a webpage 206 via the web browser 126.

As illustrated, the aggregation service 112 may enable selection by the member 104 to receive additional information. For example, the member may receive additional information by selecting the "add updates" button 208. In this way, the member 104 may follow information for the non-member authored using sources that are included in the contact record 122. Other members may also select to receive information as well. For example, the member 104 may forward the contact record 122 to other members so the other members may make use of the contact record 122 to enable communication with the non-member and/or to access, follow, subscribe to or otherwise make use of information corresponding to the non-member.

In an embodiment, the social network service 102 may be configured to accept manual source selection. For example, a member 104 may manually enter a URL for a webpage used by the non-member to post information in order to enable the social network service 102 to aggregate information for the webpage.

Figure 3:
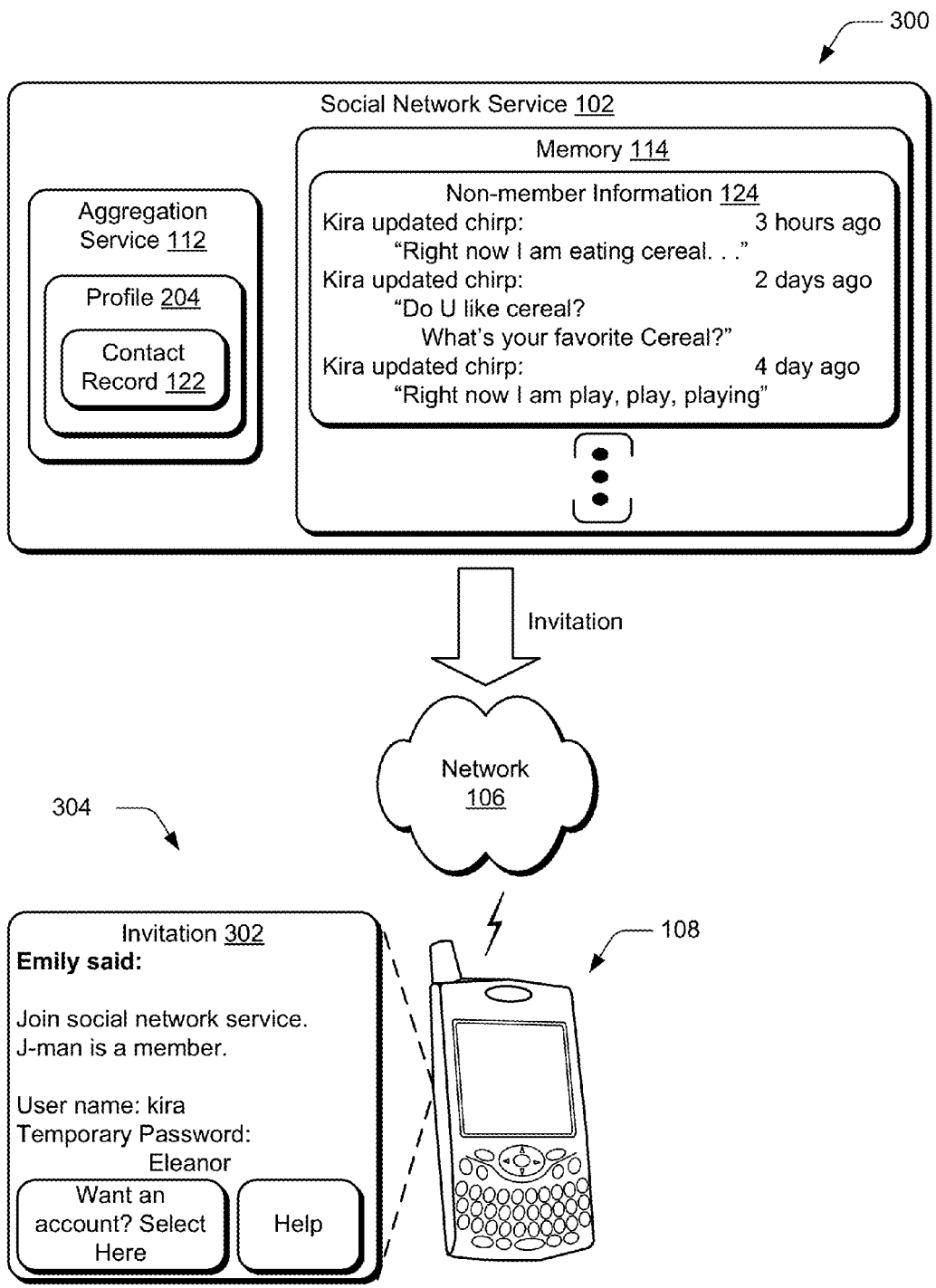
FIG. 3 is an illustration of a system in an example implementation showing implementation of the aggregation service to provide an invitation.

As illustrated in FIG. 3, a system 300 is shown in which the aggregation service 112 is used to store information for the non-member. The aggregation service 112 may store the information (e.g., non-member information 124) so the information is available to populate an account with the social network service 102 if the non-member chooses to join the social network service 102. Thus, the non-member may have access to the non-member information 124 compiled before the non-member joined the social network service 102. In addition to non-member information authored by the non-member, the aggregation service 112 may store information communicated by others to the non-member. For example, the aggregation service 112 may store an email from a member 104 to the non-member.

In an embodiment, the aggregation service 112 is configured to send an invitation 302 to the non-member to establish an account with the social network service 102. For example, the aggregation service 112 may send an instant message 304 to the non-member in response to an interaction by the member with information corresponding to the non-member.

The invitation 302 may include information from the member 104, data that is useable to create an account with the social network service 102, and so forth. Example data may include a password, user name, a link, an account identifier, and so on. In addition to information from the member 104, the invitation 302 may also include information about the member 104, a social network corresponding to the member, other members, social network service 102, and so forth. For example, the invitation 302 may include an advertisement, such as an advertisement that describes the features of the social network service 102, costs, terms of use, and so on. An advertisement may also be based on interactions of the members of the social network. For instance, if the members express interest in classical music via social network service 102, an ad may be configured to advertise for an upcoming symphony event or a retailer that sells classical music.

The invitation 302 may be communicated using a variety of suitable communication techniques. For example, an email invitation may be sent to a non-member by the aggregation service 112 in response to receiving a photograph posted by the non-member. In another example, aggregation service 112 may provide the invitation by adding a comment or a responsive post to a post of the non-member that is accessed by a member. The aggregation service 112 may be configured to generate the invitation automatically (e.g., in response to access by the member). Additionally or alternatively, the aggregation service 112 may be configured to obtain authorization from the member 104 prior to generating or sending the invitation 302.

When the non-member elects to establish an account, in response to the invitation 302 or otherwise, the social network service 102 may use the contact record 122 and the non-member information 124 to create the account for the non-member with the social network service 102. For instance, the social network service 102 may verify and/or authenticate the non-member identity using data from the contact record 122 before the non-member information 124 is populated to an account created for a non-member. A variety of other examples are also contemplated.

Example Procedures

The following discussion describes procedures that may be implemented utilizing the previously described systems, techniques, approaches, services, and modules. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems described above.

Figure 4:
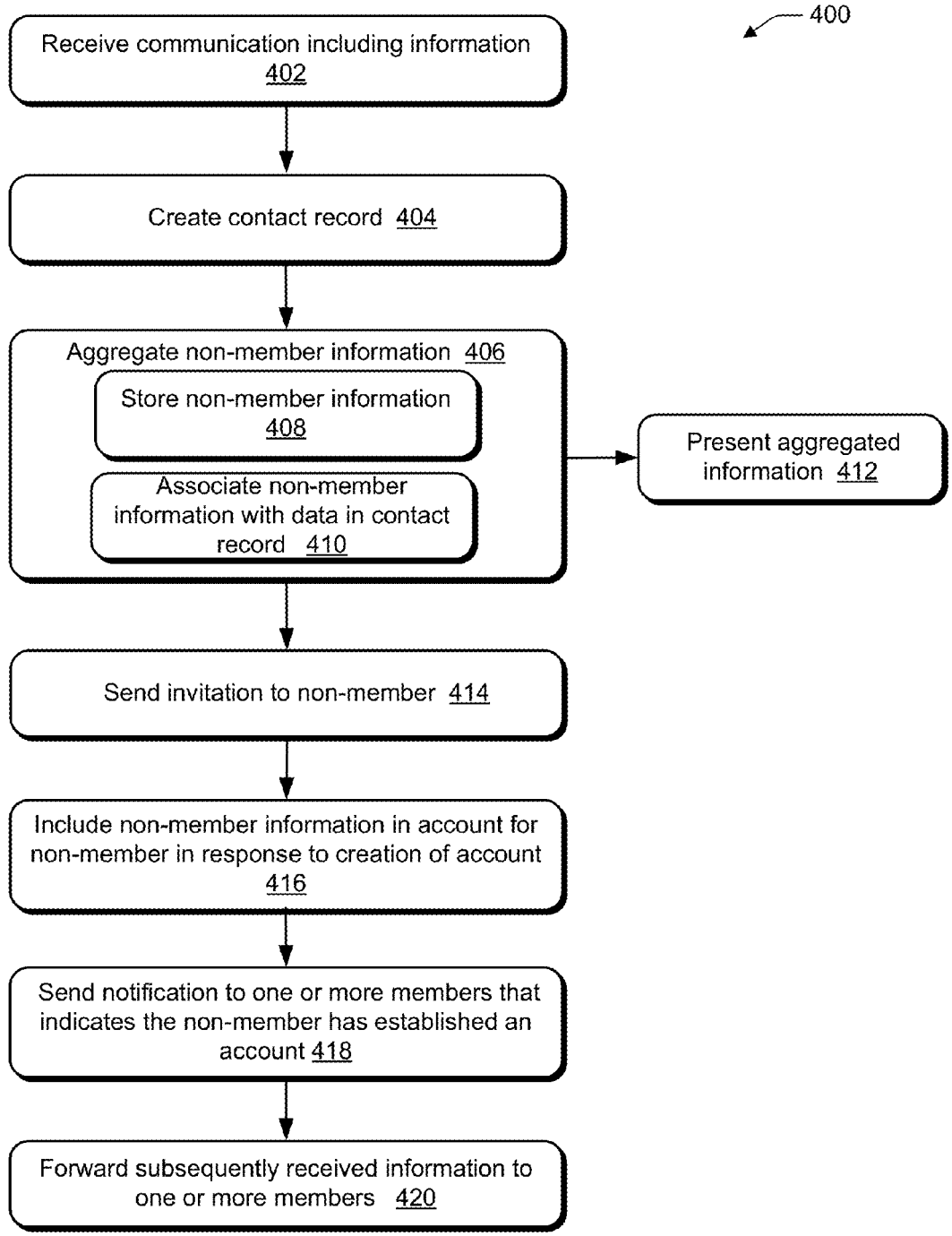
FIG. 4 is a flow diagram depicting a procedure in an example implementation that is used to aggregate information from a non-member.

FIG. 4 depicts a procedure 400 in an example implementation in which information aggregation techniques are employed to aggregate information for a service, e.g., a social network service. For example, the procedure 400 may be used to aggregate information associated with a non-member available via one or more sources.

In one or more embodiments, a communication is received that includes information from the non-member (block 402). For example, a blog posting authored by a non-member using a smart phone 108 may be communicated over a network 106 to a social network service 102. The communication of the blog posting may include data to identify a source 110 where the blog is available. Additionally, the communication may include data (e.g., a link, account data, and so on) that may be employed to create a contact record to enable communication with the non-member, e.g., receive and/or send information.

A contact record is created (block 404). The contact record may include data from the communication and/or data manually received from a member 104 to cause aggregation of information from a selected source. For example, the member 104 may type in a URL that corresponds to a website on which a non-member friend posts information. The contact record 122 may be created in response to a selection by the member 104 to interact with the information. For instance, in the above example, the member 104 may navigate a browser to view the blog posting. Responsive to this navigation, aggregation service 112 may create a contact record 122 related to the blog and/or the non-member.

When a contact record for a non-member has been created, non-member information is aggregated (block 406). For instance, the contact record 122 created in the preceding example may be used to aggregate information for the non-member corresponding to the blog. In one or more embodiments, aggregation may result in storage of the information with the social network service (block 408). The information may be stored in conjunction with the member's account with the social network service 104. An association may be formed between the information and data that is included in a contact record for the non-member (block 410). Example data includes a name of the non-member, a source of the data (e.g., source 110), account data for an account with the source, and so forth. The information may be received in response to a source pushing the information (e.g., a feed of information) or the aggregation service 112 obtaining the information, e.g., pulling the information.

In one or more embodiments, the information from the non-member is aggregated in response to a selection by the member. For example, the contact record may be created and the non-member information may be aggregated in response to a selection by a member to interact with entries of the blog authored by the non-member in the above example.

Associating the information for a non-member with the data in the contact record enables presentation of the information corresponding to the non-member to one or more members via the social network service 102. The information may be provided as a feed of information to the member 104. The contact record 122 may be included in a profile for the member (e.g., profile 204) to keep a record of contacts with the non-member and enable the member 104 to communicate information to the non-member via the social network service 102. For instance, individual updates made to a non-member blog may be received by the aggregation service 112 and added to or otherwise associated with a contact record 122 to keep track of interaction between members and the non-member.

Association of the information with data in the contact record 122 may also enable the data to be included in an account subsequently created for the non-member with the social network service 102. For instance, when an account for the non-member is created, previously complied non-member information 124 may be used to populate the account. For example, the social network service 102 may check to see whether there is existing information (e.g., a contact record 122) corresponding to a non-member when the non-member attempts to join the social network service 102. Such existing information may be stored with one or more member accounts, stored by the social network service as a separate contact record 122, and so on. Social network service 102 may make use of various identifying information (e.g., messaging address, username, password) to ascertain whether there is existing information for a particular non-member. This may involve prompting the non-member to input the identifying information and using the input to search for existing records.

When information is aggregated for a non-member, the information is presented to one or more members (block 412). In particular, the aggregation service 112 may make use of the contact record 122 and/or associated data to configure a webpage that includes the aggregated information. For example, a webpage 206 as illustrated in FIG. 3 may be configured to include various blog postings, pictures, communications, and or other suitable information corresponding to a non-member. Each member that has a contact record for the non-member may be presented with the aggregated information for output via the member's web browser. The information may be presented within various webpages output for interaction with the social network service 102, such as a profile page of a member, a group webpage, a message board, and so forth.

In one or more embodiments, an invitation is sent to the non-member (block 414). The invitation may be configured to enable creation of an account with the social network service 102. For example, the invitation may include an account name and password that may be used to create an account for the non-member. The invitation may also include a link that may be employed to create the account with social network service. The invitation may be sent in response to member interaction with information corresponding to the non-member. Example interactions include forwarding the information, accessing the information, creating a contact record based on data included with the information, communicating a reply, and so forth.

The non-member information compiled before the account is created is included in the account (block 416). For example, the social network service 102 may populate the account with information for the non-member in response to a determination that existing non-member information is available as noted above.

In one or more embodiments, a notification is sent to one or more members that indicates the non-member has established an account (block 418). The notification may include data associated with the non-member account, a link that permits the member to add the non-member to the member's social network (e.g., friends and family), and so on. In this way, the member may be informed that the non-member has signed-up for the social network service and/or has joined the member's own social network.

In further embodiments, information received from the source after creation of the account for the non-member is forwarded to one or more members from the non-member's account (block 420). For example, aggregation of information for the non-member may be discontinued once the non-member establishes an account. Instead of aggregating, the information related to the non-member may be linked to and forwarded through the non-member's account so that the member 104 may interact with the information via the social network service 102 rather than by aggregating the data from the source 110. In this manner, the non-member may continue to use the external source while giving the appearance of using the social network service 102 to originate posts and other information. The postings made through the external source may be distributed to other members in the same way as postings originating from the social network service 102. A variety of other examples are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
   receiving a communication from a non-member of a social network that indicates a source of information associated with the non-member that is external to the social network;
   creating and storing a contact record with the social network for the non-member in association with a profile of a member of the social network to enable access to information associated with the non-member from the source of information;
   storing the information from the source of information with the social network;
   aggregating the information associated with the non-member from the source of information using the contact record;
   creating a member account with the social network for the non-member including associating the information from the source of information and the contact record; and
   sending the information that is aggregated to the member of the social network in conjunction with social network updates as items for display as an aggregated information feed with the profile of a member in a webpage output by a service provider to the member to enable interaction with the social network.

2. A computer-implemented method as described in claim 1, wherein the communication includes a link to a feed of information associated with the non-member, the link being useable to access the feed of information.

3. A computer-implemented method as described in claim 1, wherein the information comprises one or more of:
   an instant message,
   a blog entry,
   a webpage, or
   an email message.

4. A computer-implemented method as described in claim 1, further comprising sending an invitation to the non-member to join a social network service provided by the service provider responsive to member interaction with the information via the social network service, the invitation being useable to create the member account for the non-member with the service provider that includes the information.

5. A computer-implemented method as described in claim 1, wherein the presenting comprises presenting a feed of information to the member within the webpage that includes the information that is aggregated.

6. A computer-implemented method as described in claim 1, wherein the service provider and the social network implement a common technical standard.

7. A computer-implemented method as described in claim 1, further comprising:
receiving additional information from the source of information subsequent to said creating the member account for the non-member, and
forwarding the additional information from the source of information to an account for the member, the information being forwarded using the member account created for the non-member to appear as though the additional information originated from the member account created for the non-member.

8. One or more computer-readable media other than signals per se comprising instructions that are executable to:
check for individual updates that are available for a non-member of a social network service from an external source;
create a contact record for the non-member associated with a profile of a member of the social network service;
responsive to receipt of a selection of the information for the non-member by the member of the social network service, aggregate the individual updates for the non-member from the external source;
send information associated with individual updates that are available for the non-member of the social network service as items for display as an aggregated information feed with the profile of the member of the social network service; and
create a member account with the social network service for the non-member, including the information associated with individual updates and the contact record.

9. One or more computer-readable media as described in claim 8, wherein the selection comprises one or more of:
a manual selection,
automatic selection based on a communication received by the member.

10. One or more computer-readable media as described in claim 8, wherein the information comprises one or more of:
a blog entry,
a web page,
an instant message, or
an electronic mail message.

11. One or more computer-readable media as described in claim 8, further comprising sending an invitation to the non-member that is useable to create the member account with the social network service.

12. One or more computer-readable media as described in claim 8, wherein the instructions are further executable to send a notification to an account for the member responsive to creation of the member account for the non-member.

13. One or more computer-readable media as described in claim 8, wherein the instructions are further executable to:
receive information from the external source subsequent to creation of the member account for the non-member, and
forward the information to an account for the member, the information being forwarded using the member account created for the non-member to appear as though the information originated from the member account created for the non-member.

14. A processing device comprising:
one or more processors; and
a memory having instructions stored therein that are executable by the one or more processors to perform operations including:
associating a non-member of a social network service with multiple members of the social network service by creating contact records for the non-member in profiles for the multiple members;
receiving information from a feed of information external to the social network service that is associated with the non-member of the social network service;
aggregating the information from the feed associated with the non-member with the profiles of the multiple members that have the contact records for the non-member to make the information available for presentation in aggregated feeds within webpages for the profiles of the multiple members along with other social network updates provided by the social network service to the members of the social network service; and
responsive to the non-member joining the social network service, populating a member account for the non-member with the contact records and the information from the feed associated with the non-member.

15. The processing device as described in claim 14, wherein the member account for the non-member is created subsequent to the information from the feed being associated with the profiles of the multiple members.

16. The processing device as described in claim 14, wherein the information is aggregated responsive to receipt of selection by a particular said member.

17. The processing device as described in claim 14, wherein the instructions further include sending an invitation to the non-member that includes data useable to create the member account for the non-member with the social network service that includes the information received prior to creation of the member account for the non-member.

18. The processing device as described in claim 17, wherein the data comprises a link to a webpage that is operable to create the member account for the non-member.

19. The processing device as described in claim 18, wherein the data included with the information comprises one or more of:
an indication of a source of the feed of information,
data useable to create a contact record,
account information for the non-member with the source, or
a password.

20. The processing device as described in claim 15, wherein the information comprises media content.

* * * * *